United States Patent
Aldana et al.

(10) Patent No.: US 7,693,228 B2
(45) Date of Patent: Apr. 6, 2010

(54) CHANNEL ESTIMATION FOR ORTHOGONAL PREAMBLES IN A MIMO SYSTEM

(75) Inventors: Carlos Aldana, San Francisco, CA (US); Jason A. Trachewsky, Menlo Park, CA (US)

(73) Assignee: Broadcom Corporation, Irvine, CA (US)

( * ) Notice: Subject to any disclaimer, the term of this patent is extended or adjusted under 35 U.S.C. 154(b) by 861 days.

(21) Appl. No.: 11/298,157

(22) Filed: Dec. 9, 2005

(65) Prior Publication Data

US 2007/0076811 A1   Apr. 5, 2007

Related U.S. Application Data

(60) Provisional application No. 60/722,843, filed on Sep. 30, 2005.

(51) Int. Cl.
*H04B 7/02* (2006.01)

(52) U.S. Cl. .................. 375/267; 375/259; 375/219; 375/295; 375/316; 370/208; 370/210

(58) Field of Classification Search ............... 375/267, 375/259, 219, 295, 316; 370/208, 210
See application file for complete search history.

(56) References Cited

U.S. PATENT DOCUMENTS

| | | | |
|---|---|---|---|
| 2002/0041635 A1* | 4/2002 | Ma et al. | 375/267 |
| 2002/0122381 A1* | 9/2002 | Wu et al. | 370/208 |
| 2002/0122383 A1* | 9/2002 | Wu et al. | 370/210 |
| 2004/0233838 A1* | 11/2004 | Sudo et al. | 370/208 |

* cited by examiner

*Primary Examiner*—David C Payne
*Assistant Examiner*—Zewdu Kassa
(74) *Attorney, Agent, or Firm*—Garlick Harrison & Markison

(57) ABSTRACT

A general architecture scheme to perform channel estimation on orthogonal transmissions for any number of transmitting antennas present. Generally, the channel estimation is applicable for wireless communications in a MIMO system.

15 Claims, 10 Drawing Sheets

CHANNEL ESTIMATION FOR ORTHOGONAL PREAMBLES IN A MIMO SYSTEM

PRIORITY INFORMATION

This application claims the benefit of priority to U.S. Provisional Patent Application Ser. No. 60/722,843; filed Sep. 30, 2005; and titled "Channel Estimation For Orthogonal Preambles In A MIMO System," which is incorporated herein by reference.

BACKGROUND OF THE INVENTION

1. Technical field of the invention

The embodiments of the invention relate to wireless communications and more particularly to channel estimation in a receiver of a multiple-input and multiple-output system.

2. Description of related art

Communication systems are known to support wireless and wire lined communications between wireless and/or wire lined communication devices. Such communication systems range from national and/or international cellular telephone systems, the Internet and to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, et cetera, communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via a public switch telephone network, via the Internet, and/or via some other wide area network.

For each wireless communication device to participate in wireless communications, it typically includes a built-in radio transceiver (i.e., receiver and transmitter) or is coupled to an associated radio transceiver (e.g., a station for in-home and/or in-building wireless communication networks, RF modem, etc.). The receiver may be coupled to an antenna and the receiver may include a low noise amplifier, one or more intermediate frequency stages, a filtering stage, and a data recovery stage. The low noise amplifier receives inbound RF signals via the antenna and amplifies them. The one or more intermediate frequency stages mix the amplified RF signals with one or more local oscillators to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

The transmitter typically includes a data modulation stage, one or more intermediate frequency stages, and a power amplifier stage. The data modulation stage converts raw data into baseband signals in accordance with a particular wireless communication standard. The one or more intermediate frequency stages mix the baseband signals with one or more local oscillators to produce RF signals. The power amplifier amplifies the RF signals prior to transmission via an antenna.

In traditional wireless systems, the transmitter may include one antenna for transmitting the RF signals, which are received by a single antenna, or multiple antennas, of a receiver. When the receiver includes two or more antennas, the receiver generally selects one of them to receive the incoming RF signals. In this instance, the wireless communication between the transmitter and receiver is a single-output-single-input (SISO) communication, even if the receiver includes multiple antennas that are used as diversity antennas (i.e., selecting one of them to receive the incoming RF signals). For SISO wireless communications, a transceiver includes one transmitter and one receiver. Currently, most wireless local area networks (WLAN) that are IEEE 802.11, 802.11a, 802,11b, or 802.11g employ SISO wireless communications.

Other types of wireless communications include single-input-multiple-output (SIMO), multiple-input-single-output (MISO), and more recently, multiple-input-multiple-output (MIMO). In a SIMO wireless communication, a single transmitter processes data into radio frequency signals that are transmitted to a receiver. The receiver includes two or more antennas and two or more receiver paths. Each of the antennas receives the RF signals and provides them to a corresponding receiver path (e.g., LNA, down conversion module, filters, and ADCs). Each of the receiver paths processes the received RF signals to produce digital signals, which are combined and then processed to recapture the transmitted data.

For a multiple-input-single-output (MISO) wireless communication, the transmitter includes two or more transmission paths (e.g., digital to analog converter, filters, up-conversion module, and a power amplifier) that each converts a corresponding portion of baseband signals into RF signals, which are transmitted via corresponding antennas to a receiver. The receiver includes a single receiver path that receives the multiple RF signals from the transmitter.

For a multiple-input-multiple-output (MIMO) wireless communication, the transmitter and receiver each include multiple paths. In such a communication, the transmitter parallel processes data using a spatial and time encoding function to produce two or more streams of data. The transmitter includes multiple transmission paths to convert each stream of data into multiple RF signals. The receiver receives the multiple RF signals via multiple receiver paths that recapture the streams of data utilizing a spatial and time decoding function. The captured receive signals are jointly processed to recover the original data.

With the various types of wireless communications (e.g., SISO, MISO, SIMO, and MIMO) and standards (e.g., IEEE 802.11, IEEE 802.11a, IEEE 802.11b, IEEE 802.11g, IEEE 802.11n in, extensions and modifications thereof), a large number of combination of types and standards is possible. However, when a wireless communication utilizes MIMO format for communicating between a receiver and a transmitter, complexities result due to the multiple transmission and receive paths for a given signal. For example, estimating channels at the receiver for a received signal generally requires taking into account the multiple signal paths from the transmitter. Accordingly, by providing a particular transmitting technique to allow channel estimation to be performed in a receiver when multiple signal transmission paths are present, wireless communication standards may be advanced for a multiple transmission path system(s).

SUMMARY OF THE INVENTION

The present invention is directed to apparatus and methods of operation that are further described in the following Brief Description of the Drawings, the Detailed Description of the Embodiments of the Invention, and the Claims. Other features and advantages of the present invention will become apparent from the following detailed description of the embodiments of the invention made with reference to the accompanying drawings.

DETAILED DESCRIPTION OF THE EMBODIMENTS OF THE INVENTION

The embodiments of the present invention may be practiced in a variety of settings that implement baseband processing in a wireless communication device.

Figure 1:
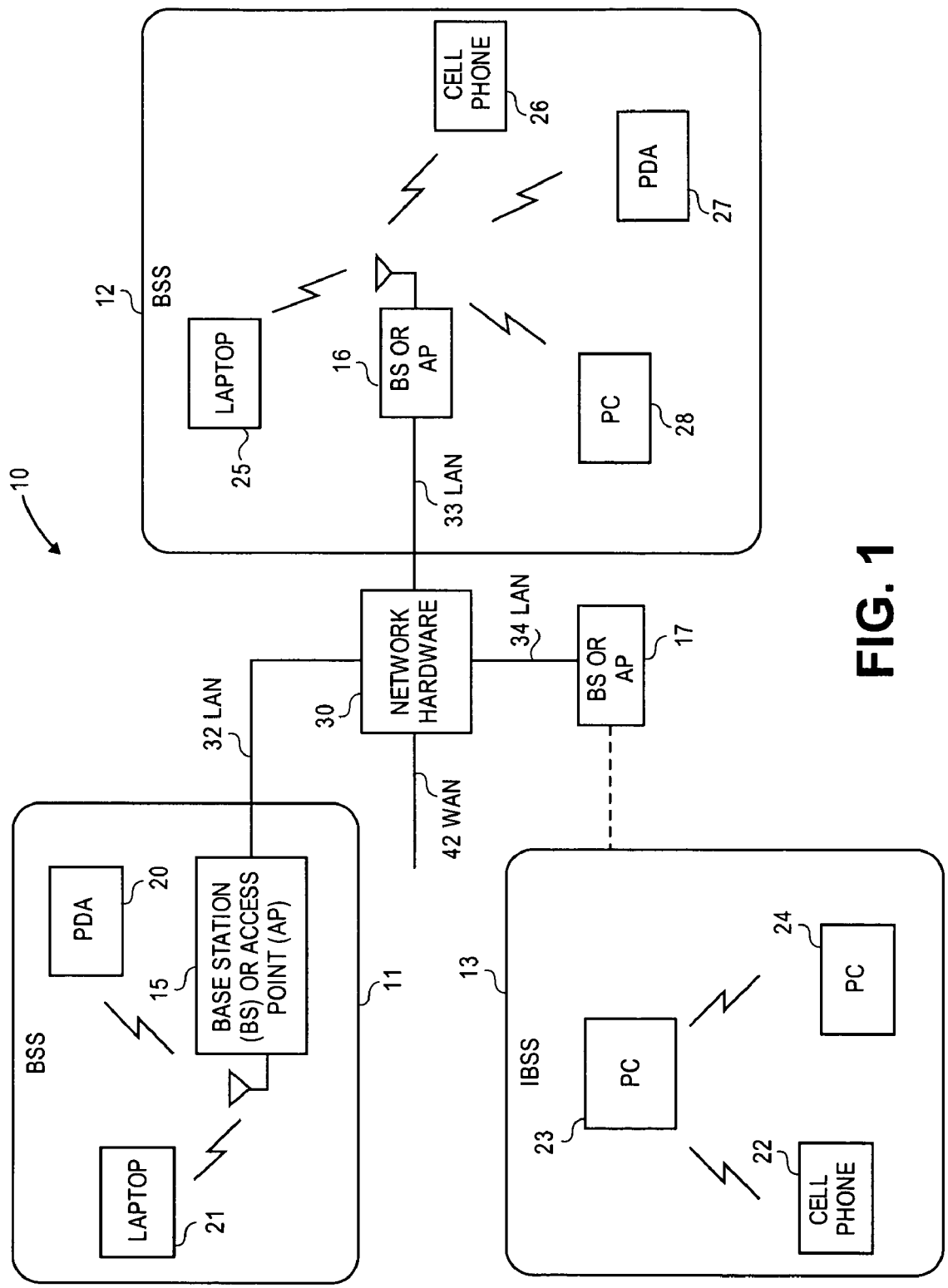
FIG. 1 is a block schematic diagram illustrating a wireless communication system in accordance with one embodiment of the present invention.

FIG. 1 is a schematic block diagram illustrating a communication system 10 that includes a plurality of base stations and/or access points (BS/AP) 15, 16, 17, a plurality of wireless communication devices 20-28 and a network hardware component 30. Network hardware component 30, which may be a router, switch, bridge, modem, system controller, et cetera, may provide a wide area network (WAN) coupling 31 for communication system 10. Furthermore, wireless communication devices 20-28 may be of a variety of devices, including laptop computers 21, 25; personal digital assistants (PDA) 20, 27; personal computers (PC) 23, 24, 28; and/or cellular telephones (cell phone) 22, 26. The details of the wireless communication devices shown is described in greater detail with reference to FIG. 2.

Wireless communication devices 22, 23, and 24 are shown located within an independent basic service set (IBSS) area 13 and these devices communicate directly (i.e., point to point). In this example configuration, these devices 22, 23, and 24 typically communicate only with each other. To communicate with other wireless communication devices within system 10 or to communicate outside of system 10, devices 22-24 may affiliate with a base station or access point, such as BS/AP 17, or one of the other BS/AP units 15, 16.

BS/AP 15, 16 are typically located within respective basic service set (BSS) areas 11, 12 and are directly or indirectly coupled to network hardware component 30 via local area network (LAN) couplings 32, 33. Such couplings provide BS/AP 15, 16 with connectivity to other devices within system 10 and provide connectivity to other networks via WAN connection 31. To communicate with the wireless communication devices within its respective BSS 11, 12, each of the BS/AP 15, 16 has an associated antenna or antenna array. For instance, BS/AP 15 wirelessly communicates with wireless communication devices 20, 21, while BS/AP 16 wirelessly communicates with wireless communication devices 25-28. Typically, the wireless communication devices register with a particular BS/AP 15, 16 to receive services within communication system 10. As illustrated, when BS/AP 17 is utilized with IBSS area 13, LAN coupling 17 may couple BS/AP 17 to network hardware component 30.

Typically, base stations are used for cellular telephone systems and like-type systems, while access points are used for in-home or in-building wireless networks (e.g., IEEE 802.11 and versions thereof, Bluetooth, and/or any other type of radio frequency based network protocol). Regardless of the particular type of communication system, each wireless communication device includes a built-in radio and/or is coupled to a radio.

Figure 2:
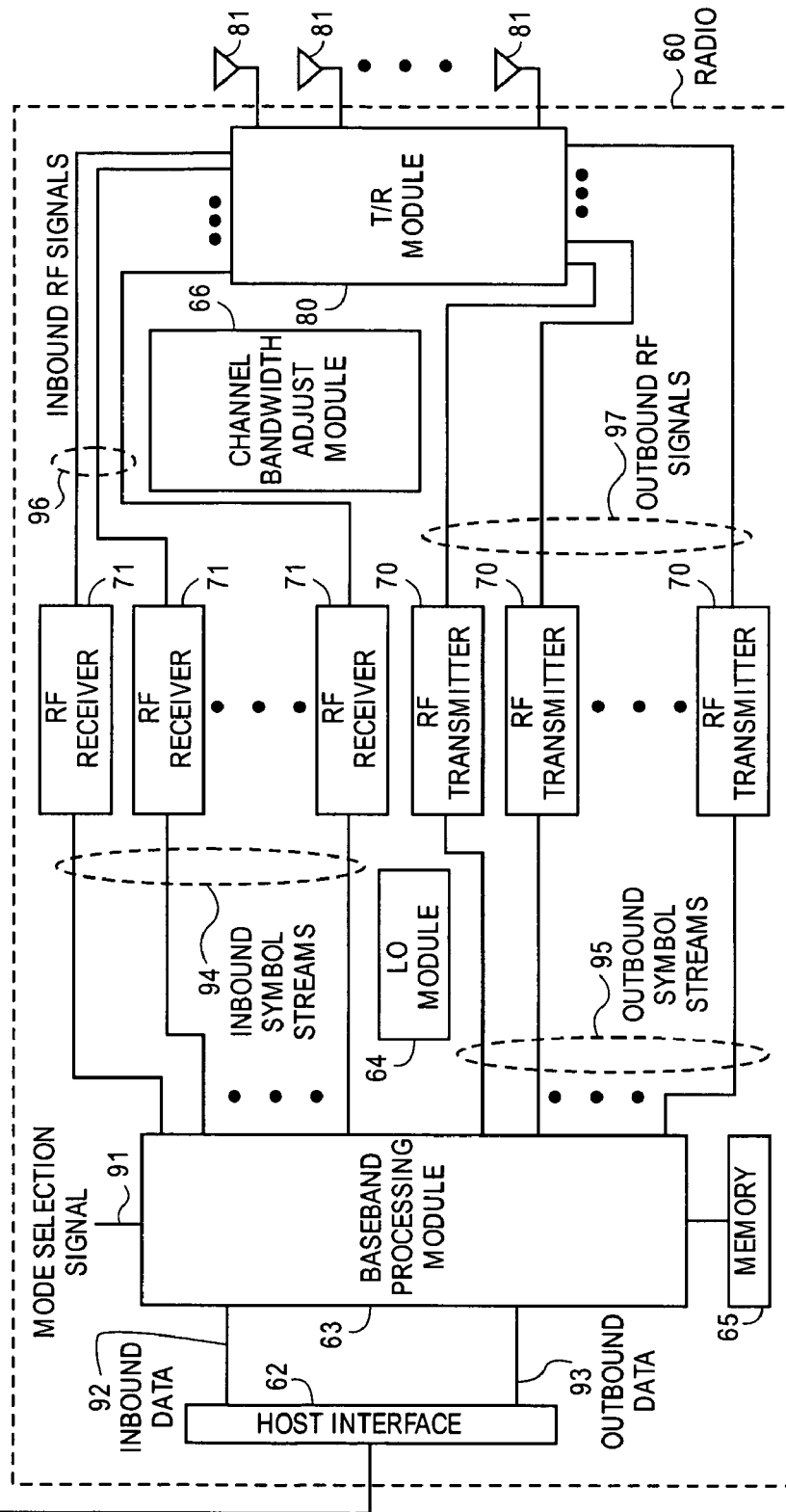
FIG. 2 is a block schematic block diagram illustrating a wireless communication device in accordance with one embodiment of the present invention.

FIG. 2 is a schematic block diagram illustrating a wireless communication device that includes a host 40 and an associated radio 60. Host 40 may be one of the devices 20-28 shown in FIG. 1. For cellular telephone hosts, radio 60 is typically a built-in component. For personal digital assistant hosts, laptop hosts, and/or personal computer hosts, radio 60 may be built-in or an externally coupled component.

As illustrated, host 40 includes a processing module 50, memory 52, radio interface 54, input interface 58 and output interface 56. Processing module 50 and memory 52 execute corresponding instructions that are typically done by the host device. For example, for a cellular telephone host device, processing module 50 may perform the corresponding communication functions in accordance with a particular cellular telephone standard.

Generally, radio interface 54 allows data to be received from and sent to radio 60. For data received from radio 60 (such as inbound data 92), radio interface 54 provides the data to processing module 50 for further processing and/or routing to output interface 56. Output interface 56 provides connectivity on line 57 to an output device, such as a display, monitor, speakers, et cetera, in order to output the received data. Radio interface 54 also provides data from processing module 50 to radio 60. Processing module 50 may receive outbound data on line 59 from an input device, such as a keyboard, keypad, microphone, et cetera, via input interface 58 or generate the data itself. For data received via input interface 58, processing module 50 may perform a corresponding host function on the data and/or route it to radio 60 via radio interface 54.

Radio 60 includes a host interface 62, a baseband processing module 63, memory 65, one or more radio frequency (RF) transmitter units 70, a transmit/receive (T/R) module 80, one or more antennas 81, one or more RF receivers 71, a channel bandwidth adjust module 66, and a local oscillation module 64. Baseband processing module 63, in combination with operational instructions stored in memory 65, executes digital receiver functions and digital transmitter functions. The digital receiver functions include, but are not limited to, digital intermediate frequency to baseband conversion, demodulation, constellation demapping, decoding, de-interleaving, fast Fourier transform, cyclic prefix removal, space and time decoding, and/or descrambling. The digital transmitter functions include, but are not limited to, scrambling, encoding, interleaving, constellation mapping, modulation, inverse fast Fourier transform, cyclic prefix addition, space and time encoding, and digital baseband to IF conversion.

Baseband processing module 63 may be implemented using one or more processing devices. Such processing device(s) may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions.

Memory 65 may be a single memory device or a plurality of memory devices. Such a memory device may be a read-only memory, random access memory, volatile memory, non-volatile memory, static memory, dynamic memory, flash memory, and/or any device that stores digital information. Note that when processing module 63 implements one or more of its functions via a state machine, analog circuitry, digital circuitry, and/or logic circuitry, the memory storing the corresponding operational instructions may be embedded with the circuitry comprising the state machine, analog circuitry, digital circuitry, and/or logic circuitry.

In operation, radio 60 receives outbound data 93 from host 40 via host interface 62. Baseband processing module 63 receives outbound data 93 and based on a mode selection signal 91, produces one or more outbound symbol streams 95. Mode selection signal 91 typically indicates a particular mode of operation that is compliant with one or more specific modes of the various IEEE 802.11 standards. For example, in one embodiment mode selection signal 91 may indicate a frequency band of 2.4 GHz, a channel bandwidth of 20 or 22 MHz and a maximum bit rate of 54 megabits-per-second. In this general category, mode selection signal 91 may further indicate a particular rate ranging from 1 megabit-per-second to 54 megabits-per-second, or higher.

In addition, mode selection signal 91 may indicate a particular type of modulation, which includes, but is not limited to, Barker Code Modulation, BPSK, QPSK, CCK, 16 QAM and/or 64 QAM, as well as others. Mode selection signal 91 may also include a code rate, a number of coded bits per subcarrier (NBPSC), coded bits per OFDM symbol (NCBPS), and/or data bits per OFDM symbol (NDBPS). Mode selection signal 91 may also indicate a particular channelization for the corresponding mode that provides a channel number and corresponding center frequency. Mode select signal 91 may further indicate a power spectral density mask value and a number of antennas to be initially used for a MIMO communication.

Baseband processing module 63, based on mode selection signal 91, produces one or more outbound symbol streams 95 from outbound data 93. For example, if mode selection signal 91 indicates that a single transmit antenna is being utilized for the particular mode that has been selected, baseband processing module 63 produces a single outbound symbol stream 95. Alternatively, if mode selection signal 91 indicates 2, 3 or 4 antennas, baseband processing module 63 produces respective 2, 3 or 4 outbound symbol streams 95 from outbound data 93.

Depending on the number of outbound symbol streams 95 (e.g. 1 to n) produced by baseband processing module 63, a corresponding number of RF transmitters 70 are enabled to convert outbound symbol stream(s) 95 into outbound RF signals 97. Generally, each RF transmitter 70 includes a digital filter and up sampling module, a digital to analog conversion module, an analog filter module, a frequency up conversion module, a power amplifier, and a radio frequency bandpass filter. RF transmitters 70 provide outbound RF signals 97 to T/R module 80, which provides each outbound RF signal 97 to a corresponding antenna 81.

When radio 60 is in the receive mode, T/R module 80 receives one or more inbound RF signals 96 via antenna(s) 81 and provides signal(s) 96 to respective one or more RF receivers 71. RF receiver(s) 71, based on settings provided by channel bandwidth adjust module 87, converts inbound RF signals 96 into a corresponding number of inbound symbol streams 94 he number of inbound symbol streams 94 corresponds to the particular mode in which the data was received. Baseband processing module 63 converts inbound symbol streams 94 into inbound data 92, which is provided to host 40 via host interface 62.

The wireless communication device of FIG. 2 may be implemented using one or more integrated circuits. For example, host 40 may be implemented on one integrated circuit, baseband processing module 63 and memory 65 may be implemented on a second integrated circuit, and the remaining components of radio 60 (less the antennas 81) may be implemented on a third integrated circuit. As an alternative embodiment, baseband processing module 63 and radio 60 may be implemented on a single integrated circuit. In another embodiment, processing module 50 of host 40 and baseband processing module 63 may be a common processing device implemented on a single integrated circuit. Furthermore, memory 52 and memory 65 may be implemented on the same memory device and/or on the same integrated circuit as the common processing modules of processing module 50 and baseband processing module 63. It is be noted that other embodiments may be implemented with the various units of FIG. 2.

Figure 3:
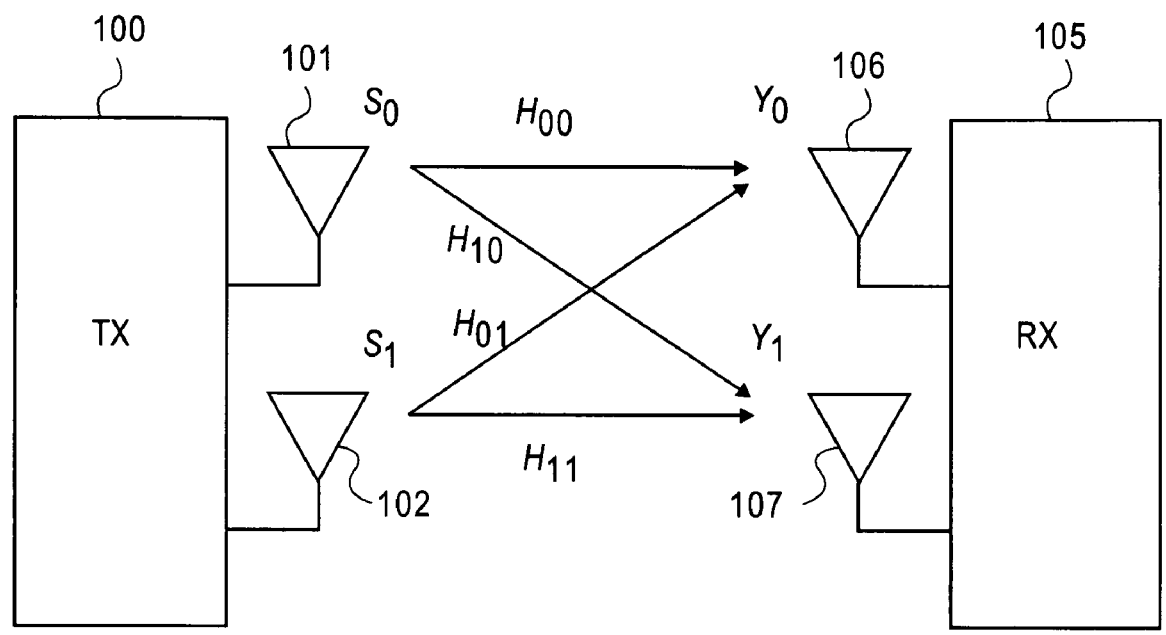
FIG. 3 is a diagram of a MIMO communication system having two antennas at a transmitter and two antennas at a receiver.

The various embodiments of the wireless communication device of FIG. 2 may be implemented in a transmitter and/or a receiver utilized for wireless communications. Typically, the communication is both ways so that the two units communicating typically will employ a transceiver in order to send and receive data. The multiple RF transmitters 70 and RF receivers 71 allow the device of FIG. 2 to be utilized in a multiple antenna transceiver system. FIG. 3 shows one particular example when communication is achieved using two antennas at the transmitter and two antennas at the receiver.

In FIG. 3 a transmitting (TX) unit 100 is shown having two antennas 101, 102, while a receiving (RX) unit 105 is shown having two antennas 106, 107. It is to be noted that both transmitting unit 100 and receiving unit 105 are generally both transceivers, but are shown as separate TX and RX units for exemplary purpose in FIG. 3. That is, TX unit 100 is transmitting data and RX unit 105 is receiving the transmitted data. The transmitted data symbol at antennas 101, 102 are noted as $S_0$ and $S_1$, respectively. The received data symbols at antennas 106, 107 are noted as $Y_0$ and $Y_1$, respectively. Since the example illustrates a two-transmit-antenna/two-receive-antenna MIMO system, the four resulting RF signal paths are noted as $H_{00}$, $H_{01}$, $H_{10}$ and $H_{11}$ (using the $H_{RX\text{-}TX}$ notation).

It is appreciated that the more advanced communication protocols may utilize multiple channels when transmitting data in order to increase the transmitted bandwidth. For example, orthogonal frequency division multiplexing (OFDM) utilize multiple tones in which each of the tones correspond to a data channel. The multiple signals are of equal energy and duration and the signal frequencies are equally separated, so that the signals orthogonal to one another.

In SISO systems, it is readily simple for the receiver to estimate the transmitted channels since there is only one transmit antenna and one receive antenna. Generally, the practice is to use a Fast Fourier Transform (FFT) so that each subchannel k is represented as:

$$Y(k)=S(k)H(k)+Z(k)$$

where S(k) denotes the known transmitted signal on subchannel k, H(k) denotes the frequency domain complex value of the impulse response on subchannel k, Y(k) denotes the signal at the receiver on subchannel k and Z(k) denotes additive interference on subchannel k. Neglecting for noise, a channel at the receiver may be identified by employing a one tap filter to equalize the received signal. A channel may be identified at the receiver by employing a channel estimation technique of estimating H from the received signal Y. For example, an estimation of H may be obtained from the above Y=SH equation (neglecting for noise) by employing a conjugate of S, in which H is defined as:

$$H=Y \text{ conjugate}(S) \div |S|^2 = YS^*$$

since $|S|^2=1$ and * where denotes a conjugate.

For example, in a typical multi-channel communication where receivers estimate the channels for a received signal, a training sequence(s) may be sent by the transmitter to train the receiver to estimate the channels. By utilizing one of a variety of techniques, such as an adaptive algorithm for maximum likelihood estimation, a receiver may converge toward an estimate of a given channel. For example, coefficients of a receiver equalizer may converge to a best estimate value for a channel during receiver training and then use the estimated values obtained from the training to recover subsequently transmitted payload data.

Thus, by utilizing a training signal in a preamble portion of a transmitted data stream from the transmitter, the receiver is able to configure itself to an estimated value of the channel for recovering the data. Applying the above equations, a known value may be transmitted with the training signal (which is noted as S) so that estimation of H may be determined. Once H estimation is calculated for each channel, H estimation is then utilized to operate on subsequent received signal Y to obtain a subsequent unknown data transmission.

When multiple channels are transmitted from TX unit 100, H estimation is more complex, since there are now four potential H values ($H_{00}$-$H_{11}$) to decipher due to the multiple antenna paths. That is, in reference to FIG. 2, outbound data 93 may be split into one or more outbound symbol streams 95, which is then sent out as one or more outbound RF signals 97. In a two transmit antenna system, such as TX unit 100 of FIG. 3, outbound data 93 is split into two paths by baseband processing module 63 and transmitted from respective two antennas 81.

Figure 4:
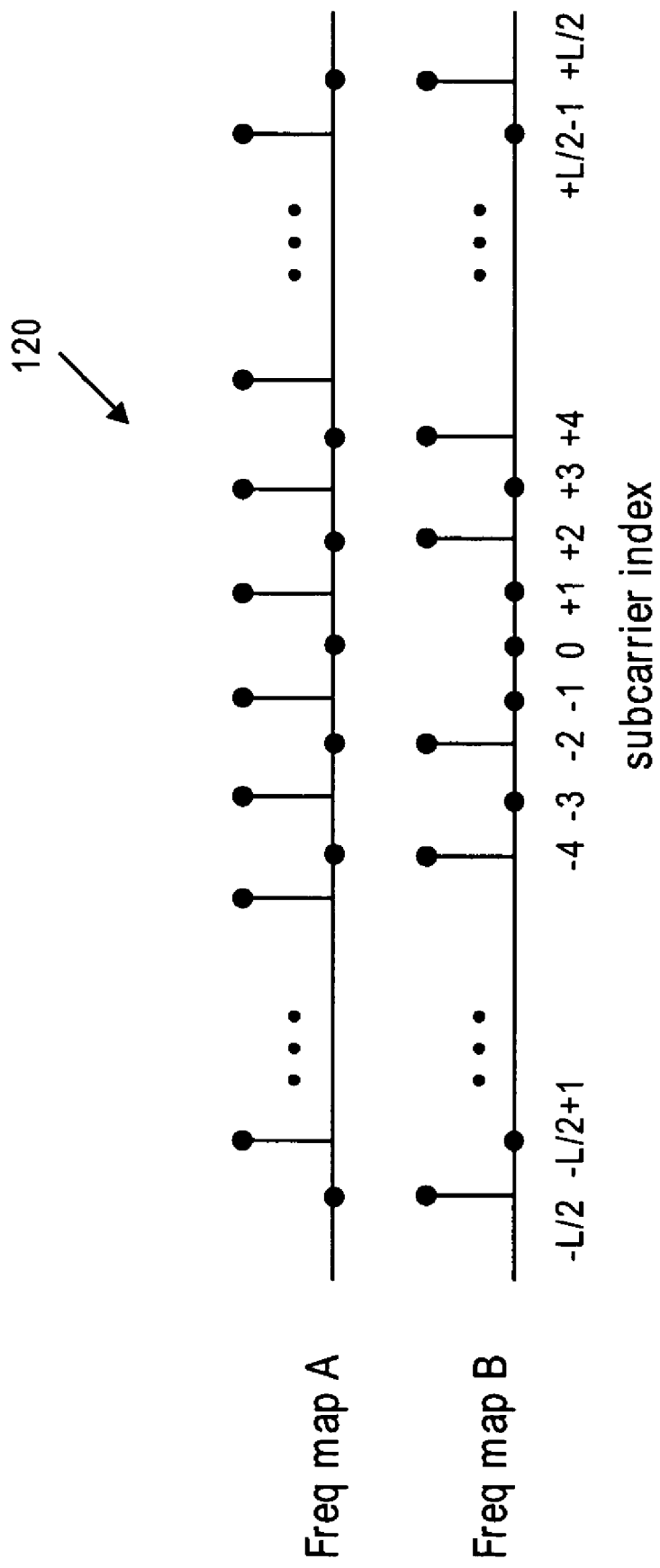
FIG. 4 is a diagram showing odd and even mapping of a subcarrier index for transmitting from the two transmitter antennas for the system of FIG. 3.
Figure 5:
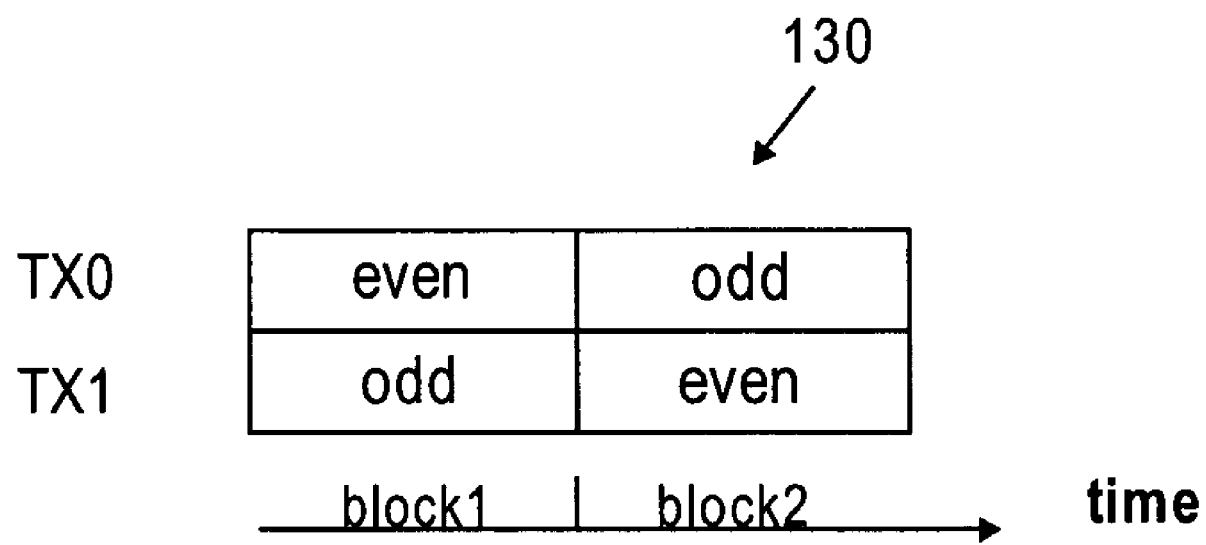
FIG. 5 is a table illustrating a transmission of a preamble from the two antennas of the transmitter of FIG. 3 over two time blocks for the subcarrier mapping of FIG. 4.

One technique of separating the outbound data into more than one transmitted data stream to train the receiver is illustrated in the example embodiment of FIGS. 4 and 5. FIG. 4 shows multiple tones, which correspond to the different subchannels of a transmitted signal. Such multiple channel transmission may be OFDM, or some other multiple channel communication protocol. The subcarrier index in FIG. 4 identifies the different subchannels. L indicates the number of active subcarriers about a center carrier frequency at index 0. The "+"numbers (+1, +2, +3 . . . ) indicate the upper band and the "−" numbers (−1, −2, −3 . . . ) indicate the lower band. In the particular embodiment shown, each subcarrier represents a subchannel (or tone) for orthogonal signal transmission.

In FIG. 4, an orthogonal tone mapping diagram 120 is shown, in which the subcarriers are separated into two frequency maps, shown as frequency map A and frequency map B. As shown, frequency map A comprises the odd tones (odd channels) and frequency map B comprises the even tones (even channels). That is, when outbound preamble data is processed into various channels for transmission (such as by baseband processing module 63 of FIG. 2) based on a communication protocol selected, the preamble is separated into even and odd subchannels for each data block of preamble data. Thus, the transmission of the separately-mapped subchannels is shown in the mapping diagram of FIG. 5.

In FIG. 5, table 130 illustrates how two transmitter antennas TX0 and TX1 transmit the even and odd tones. For the example diagram of FIG. 3, antenna 101 may be TX0 and antenna 102 may be TX1. During a first data transmission block (block 1), TX0 transmits the even subchannels and TX1 transmits the odd subchannels. Subsequently, during a second data block transmission, TX0 transmits the odd subchannels and TX1 transmits the even the subchannels. Thus, for a two antenna transmitter, antenna TX0 and TX1 alternate between sending even and odd subchannels for the two time blocks that the preamble is sent. Each block from a transmitting antenna is referred to as a symbol. For each symbol from each transmitting antenna at least one training sequence, is sent. It is to be noted that the actual mapping may be reversed from that shown in table 130, in that TX0 may send the odd subchannels during time block 1 and even subchannels during time block 2, while TX1 may send even subchannels during time block 1 and odd subchannels during time block 2.

It is to be noted that TX0 sends both even and odd indices of the subcarriers shown in FIG. 4, but at different times. Likewise, TX1 sends both even and odd indices of the subcarriers at different times. TX0 and TX1 alternate the even and odd transmissions so that at any given time block that the training symbols are sent, both even and odd subchannels are sent in each time block for the training symbols. Thus, for a transmitter having two transmitting antennas, a 2×2 matrix of training symbols are transmitted.

The odd and even preamble mapping includes a training symbol for each antenna and for each time block. The four training symbols are used to train the receiver to configure the receiver to the protocol utilized by the transmitter in sending the data. For a receive antenna p (p=0 or 1 for RX0 and RX1), the received signal may be written as:

$$Y_p^1(2k)=S(2k)H_{p,0}(2k)$$

$$Y_p^1(2k+1)=S(2k+1)H_{p,1}(2k+1)$$

$$Y_p^2(2k)=S(2k+1)H_{p,0}(2k+1)$$

$$Y_p^2(2k+1)=S(2k)H_{p,1}(2k)$$

where the superscript indicates the block number and the subscript p indicates the receiver antenna number. Note that the (2k) and (2K+1) would be reversed, if the even/odd mapping is reversed in FIG. 5 for TX0 and TX1.

As noted above in solving for estimation of H, estimated $H_{00}$, $H_{01}$, $H_{10}$ and $H_{11}$, may be calculated as follows:

$$H_{p,0}(2k)=Y_p^1(2k)S(2k)^*$$

$$H_{p,1}(2k+1)=Y_p^1(2k+1)S(2k+1)^*$$

$$H_{p,0}(2k+1)=Y_p^2(2k)S(2k+1)^*$$

$$H_{p,1}(2k)=Y_p^2(2k+1)S(2k)^*$$

where (2k) and (2k+1) denote the even and odd tones, respectively.

Thus, each tone k for each receiver antenna p may be operated on by the conjugate of S(k). Accordingly, FIG. 6 illustrates one example embodiment of implementing a simple channel estimator 140 at each receive antenna.

Figure 6:
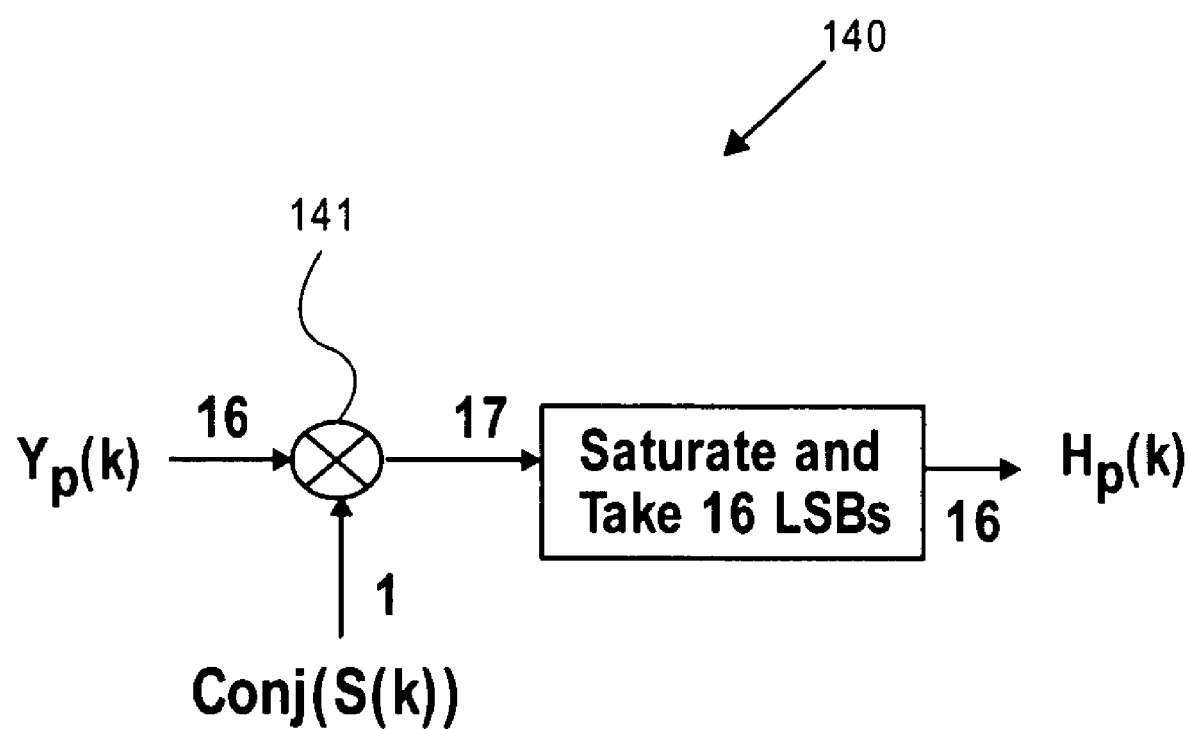
FIG. 6 is a block schematic diagram of one embodiment for implementing a channel estimator at a receiver to recover the transmitted signal for the system of FIG. 3.

In the embodiment of FIG. 6, the received signal is transformed, in which $Y_p(k)$ output of sixteen bits is combined with a one bit Conjugate(S(k)) in a multiplier 141. The 17-bit output from the multiplier 141 is first saturated and the sixteen least significant bits (LSBs) are provided as output $H_p(k)$ from estimator 140. It is to be noted that the particular implementation of channel estimator 140, including the specific number of bits shown, are for exemplary purpose only and that other embodiments may be readily implemented.

It is to be noted that the technique described above, in which $Y_p^1$ or $Y_p^2$ indicates a vector of size N, where N is the number of tones, is based on the number of "Q" transmitting antennas and "P" receive antennas. The number of receive antennas may be one or more than one. In the example described above, two transmitting antennas are present having a single signal stream at each transmitting antenna. When two transmitting antennas are present, two training symbols are utilized in the preamble with each block of data transmitted. However, the channels may be categorized into various other configurations and need not be necessarily indexed into even-odd indices. Accordingly, a general case for channel estimation is exemplified in table 150 of FIG. 7.

Figure 7:
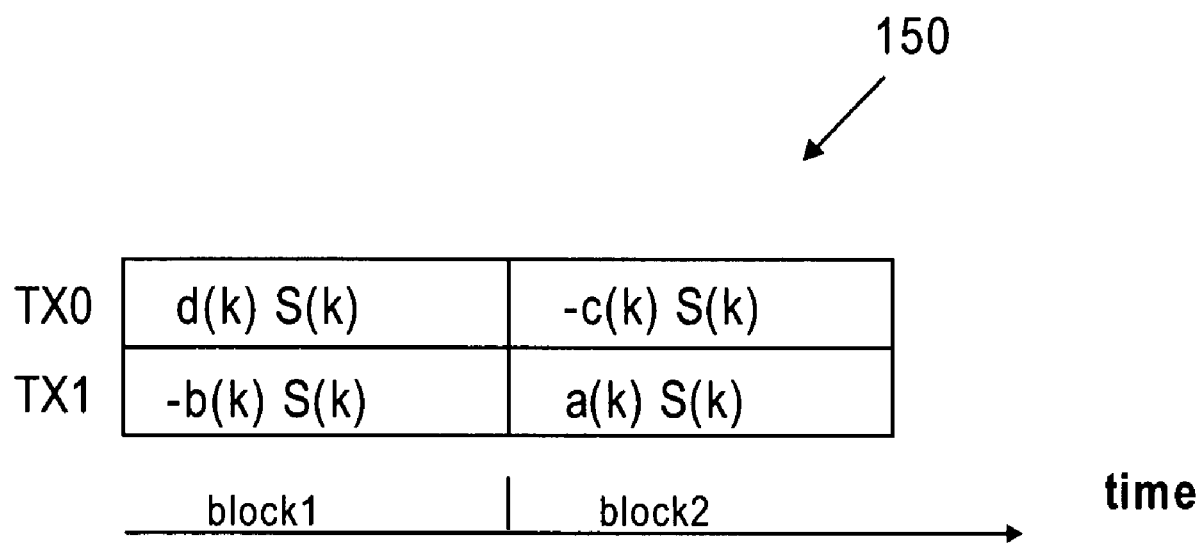
FIG. 7 is a table illustrating one embodiment for implementing a set of training symbols to be transmit as part of a preamble from a two transmitter antenna system.

Similar to table 130 of FIG. 5, table 150 of FIG. 7 shows that during a first time block, TX0 sends a symbol that contains a long training sequence S(k), which is part of the preamble, that includes a predetermined data value d(k). Also, during time block 1, TX1 sends -b(k)S(k). During time block 2, TX0 sends -c(k)S(k) and TX1 sends a(k)S(k). The data values a, b, c and d are generally predetermined values and sent as part of the training symbols for a given communication protocol being used. Data values a, b, c and d are simply referred to as coefficients herein for exemplary purpose. Furthermore, the predetermined values are known by a receiver, if the receiver is capable of operating using the given communication protocol.

Subsequently, the receiver processes the received signal on each antenna and performs the channel estimation as follows:

$$H_{p,0}(k)=Y_{block1,p}S(k)^*=d(k)H_{p0}(k)-b(k)H_{p1}(k)$$

$$H_{p,1}(k)=Y_{block2,p}S(k)^*=-c(k)H_{p0}(k)+a(k)H_{p1}(k)$$

where $Y_{block1,p}$ denotes the received signal at time block 1 by receive antenna p (p=1, 2, 3, ... P) and $Y_{block2,p}$ denotes the received signal at time block 2 by receive antenna p. Since each receive antenna performs the above calculation, the actual number of receiver antennas may vary and need not be necessarily the same number as the number of transmitting antennas.

Figure 8:
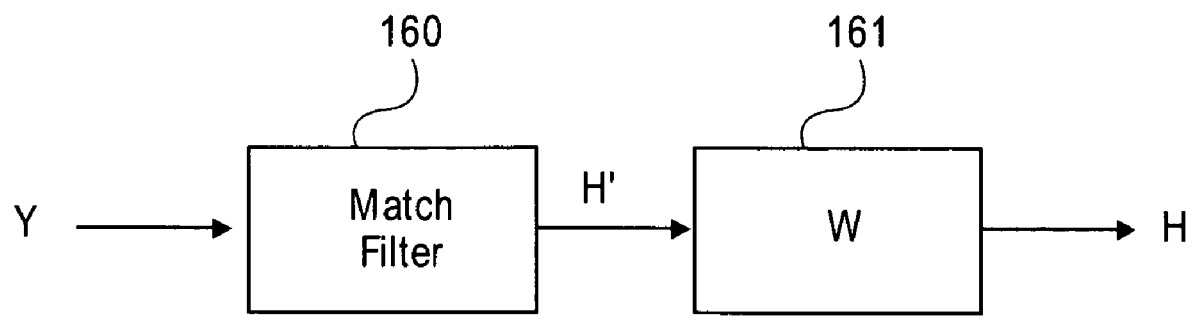
FIG. 8 is a block schematic diagram showing a use of a match filter and a weighting unit to process a received signal and to recover a complex baseband impulse response value H.

Although H may be solved directly, in some instances, an intermediary operation is performed in which a weighting operation is applied to the received signal. For example, FIG. 8 shows one such implementation in which Y is operated on by a matched filter 160 to provide an interim H'. The H' is then passed through a weighting matrix unit 161 to generate H. The weighting W(k) may be selected so that W(k) belongs to a subset of matrices that may be stored in the receiver, allowing the family of matrices to be quantized to a small number of bits. This prevents quantization of each entry of the matrix W(k), which reduces the amount of bit storage by a factor of $Q^2$. That is, since there are $Q^2$ entries in the matrix with possible redundant entries, the whole matrix is quantized, instead of quantizing each entry, Thus, $$\begin{bmatrix} H_{p,0}(k) \\ H_{p,1}(k) \end{bmatrix} = W(k) \begin{bmatrix} H'_{p,0}(k) \\ H'_{p,1}(k) \end{bmatrix}$$

and when a(k), -b(k), -c(k) and d(k) values are selected as weighting values, it follows that:

$$\begin{bmatrix} H_{p,0}(k) \\ H_{p,1}(k) \end{bmatrix} = W(k) \begin{bmatrix} H'_{p,0}(k) \\ H'_{p,1}(k) \end{bmatrix}$$

$$= \frac{1}{a(k)d(k) - b(k)c(k)} \begin{bmatrix} a(k) & b(k) \\ c(k) & d(k) \end{bmatrix} \begin{bmatrix} H'_{p,0}(k) \\ H'_{p,1}(k) \end{bmatrix}$$

For example, in one embodiment of even/odd tones, b(2k)=c(2k)=0, and a(2k+1)=d(2k+1)=0 for integer k. The nonzero entries of the abcd matrix are [sqrt(2)] for even tones (block 1 of FIG. 7) and [-sqrt(2)] for odd tones (block 2 of FIG. 7), where "sqrt" denotes the square root. That is, a(2k)=d(2k)=sqrt(2) and b(2k+1)=c(2k+1)=sqrt(2), which is equivalent to -b(2k+1)=-c(2k+1)=-sqrt(2).

In matrix form $$\begin{bmatrix} a & -b \\ -c & d \end{bmatrix},$$

matrix W is $$\begin{bmatrix} \frac{1}{\sqrt{2}} & 0 \\ 0 & \frac{1}{\sqrt{2}} \end{bmatrix}$$

for even tones and $$\begin{bmatrix} 0 & -\frac{1}{\sqrt{2}} \\ -\frac{1}{\sqrt{2}} & 0 \end{bmatrix}$$

for odd tones.

Figure 9:
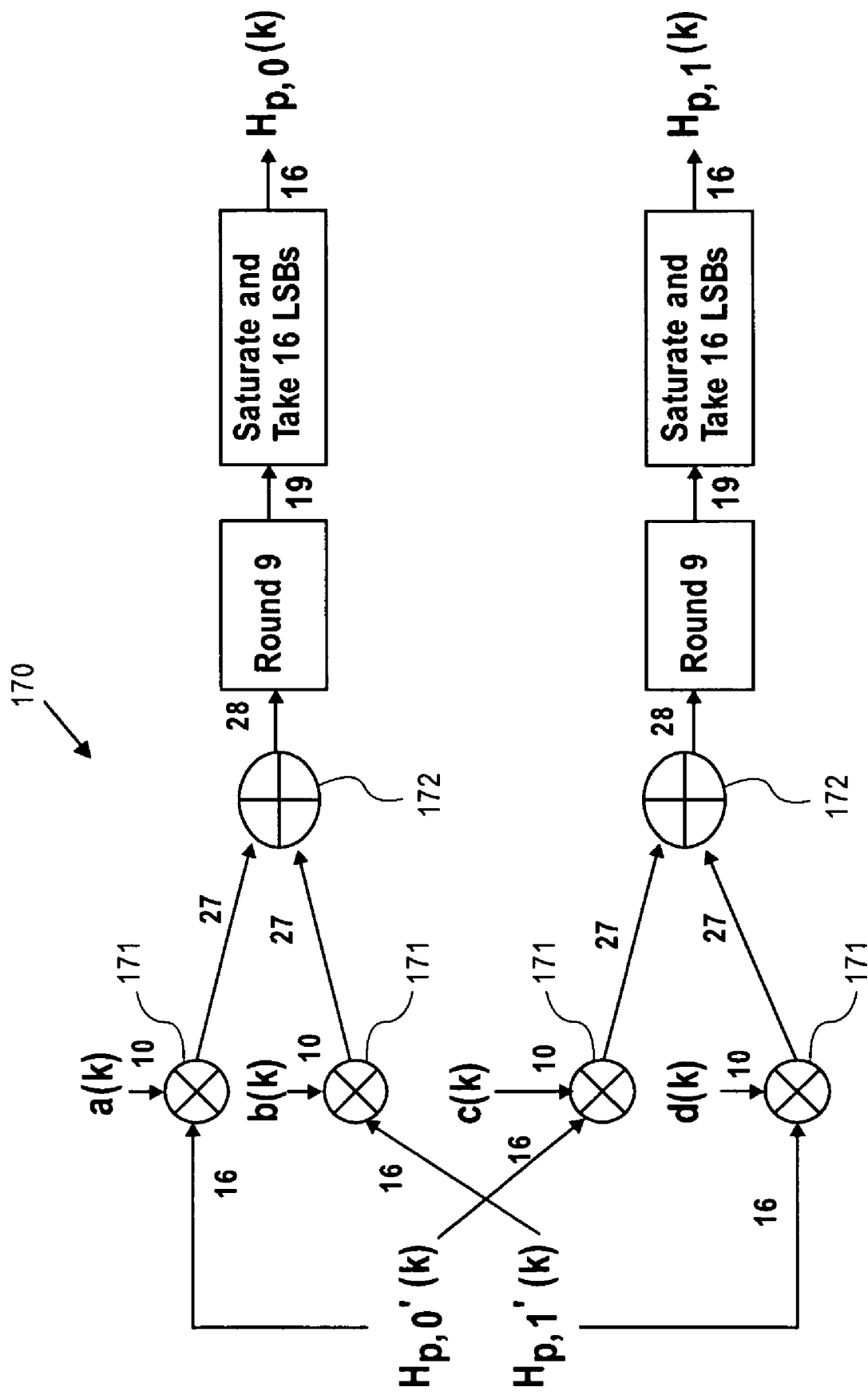
FIG. 9 is a block schematic diagram of one embodiment for implementing a channel estimator at a receiver to recover the transmitted signal using the training symbols of FIG. 7.

One example implementation to obtain H for the above example is illustrated in FIG. 9. In FIG. 9, coefficient values a(k), b(k), c(k) and d(k) are input to respective multipliers 171 to be combined with $H_{p,0}'(k)$ or $H_{p,1}'(k)$ and summed by respective adders 172 to generate $H_{p,0}(k)$ and $H_{p,1}(k)$. In one embodiment, H'values are sixteen bits in length and the coefficients a, b, c and d are ten bits in length. The 28-bit outputs from adders 172 are rounded to 19-bit values and saturated to take the sixteen LSBs as outputs $H_{p,0}(k)$ and $H_{p,1}(k)$, respectively.

As described in the above examples, in a multi-transmit antenna system, a subcarrier index of a transmitted signal may be separated into separate transmission paths for transmission by corresponding antennas. This is typically performed by a baseband processor, such as baseband processing module 63 of FIG. 2. Training symbols may be assigned to time blocks to transmit the preamble by the corresponding antennas. In a particular embodiment employing two transmitting antennas for orthogonal signals, a training symbol is sent from each of the two transmitting antennas during two time blocks. Each training symbol has a known coefficient value pertaining to the particular communication protocol being used. In one embodiment for a two antenna transmitter, the subcarriers are mapped into two indices of odd and even channels or tones (tone-interleaving). One transmitting antenna transmits even tones while the other transmits odd tones during a first time block and during a second time block, the even/odd transmissions from the two transmitting antennas are reversed. Thus, both even and odd tones are sent from each antenna, as well as in each time block during a preamble period. Training symbols accompany the preamble transmission during each block of data transmission for each antenna to train the receiver to estimate the identification of the transmitted channels, so to allow the receiver to recover the transmitted data.

Therefore, either the number of transmit antennas "Q", or the number of streams to be transmitted, determine the total number of training symbols that are to be sent. The receiver may have one antenna or a multiple of antennas to receive the transmitted data, since each receiver antenna signal path performs similar calculations to estimate the channels and recover the data. In the above described example embodiment, a 4×4 system is shown in which each transmitting antenna transmits a single stream. However, in other embodiments, multiple transmitting antennas may transmit a single stream. In general, the number of streams is less than or equal to the number of transmitting antennas. For example, four transmitting antennas transmitting two streams functions equivalently to the two transmit antenna system described above. Accordingly, the various embodiments of multiple antenna systems may be adapted for multiple streams, whether one transmitting antenna or multiple transmitting antennas are present.

It is to be noted that various other embodiments may be readily implemented to practice the invention. For example, in the transmission of the subcarrier index, each frequency map may send N, 2N or higher multiplier of samples for each symbol, where N indicates the number of subchannels used for the transmission. With multiple symbols (RN) being sent, where R is some integer value, the FFT points for each symbol may be averaged first and combined or the FFT points may be combined first and then averaged in the receiver. Furthermore, in the described example pertaining to FIG. 7, complex entries are associated with the coefficients a, b, c and d. As an alternative approach, the entries may be phase derotated first in order to remove the complex component, so that the entries are real values for calculation. For example, a phasor may be applied to the transmit symbols to use a cyclic shift, which is a phase shift in the frequency domain, to derotate to make it a real value for real matrix operation. It is appreciated that these are just some of the few example embodiments that may be implemented as an alternative embodiment for practicing the invention.

Figure 10:
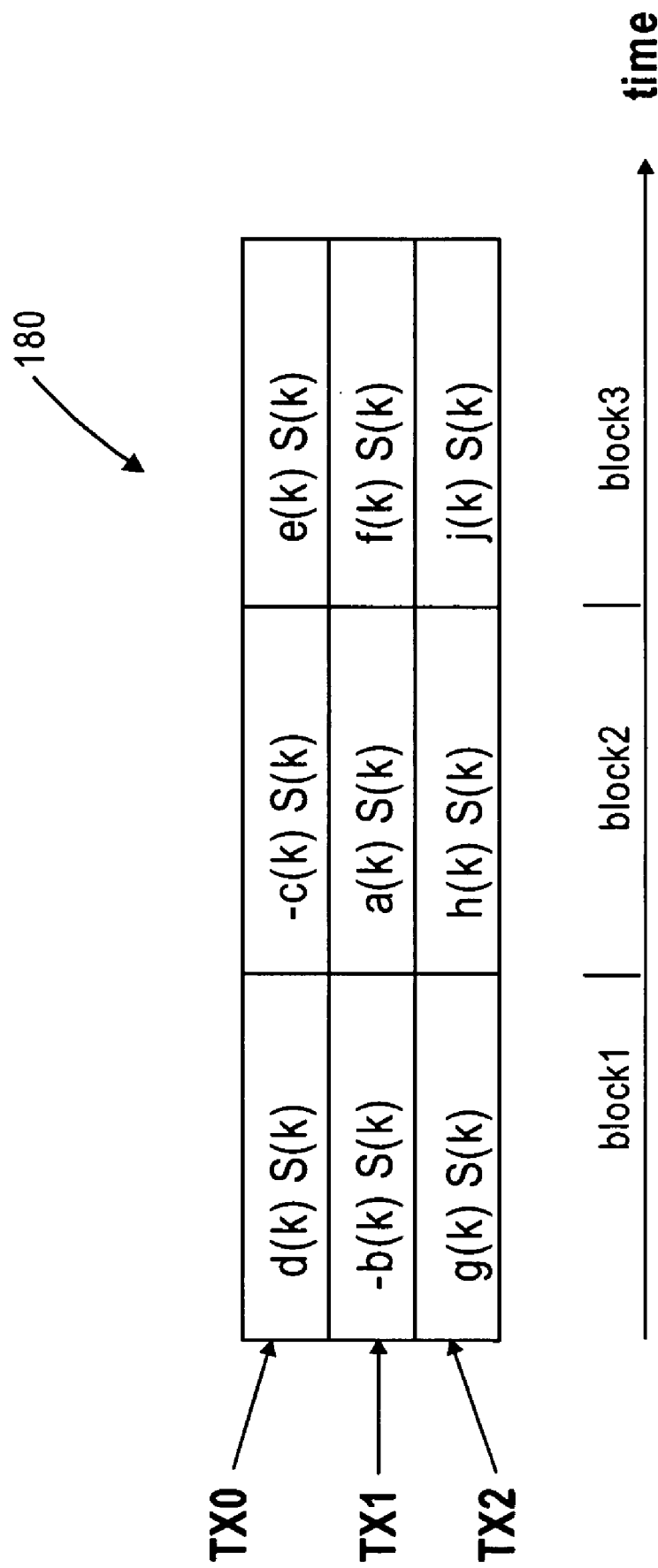
FIG. 10 is a table illustrating one embodiment for implementing a set of training symbols to be transmit as part of a preamble from a three transmitter antenna system.

Additionally, the invention is not limited to just two transmitting antennas. FIG. 10 illustrates a three transmitting antenna system, having transmitting antennas TX0, TX1 and TX2. As shown in table 180, when three TX antennas are used, a 3×3 entries are utilized for transmission over three time blocks. Nine different training symbol values are used, accompanied by respective predetermined coefficient values:

a(k), -b(k), -c(k), d(k), e(k), f(k), g(k), h(k), j(k)

Since there are three transmitting antennas, three time blocks are employed (3×3 matrix). The subchannels may be separated into three separate subcarrier index configuration. In one embodiment where tone-interleaving is used, every third tone is configured into an index. Thus, TX0 may transmit $1^{st}$, $4^{th}$ $7^{th}$ ... tones, TX1 may transmit $2^{nd}$, $5^{th}$, $8^{th}$ ... tones and TX1 may transmit $3^{rd}$, $6^{th}$, $9^{th}$ ... tones. The relevant estimator equation utilizing the weighting factor W may be represent for each tone k as:

$$H_{p,0}'(k)=Y_{block1,p}S(k)^*=d(k)H_{p,0}(k)-b(k)H_{p,1}(k)+g(k)H_{p,2}(k)$$

$$H_{p,1}'(k)=Y_{block2,p}S(k)^*=-c(k)H_{p,0}(k)+a(k)H_{p,1}(k)+h(k)H_{p,2}(k)$$

$$H_{p,2}'(k)=Y_{block3,p}S(k)^*=e(k)H_{p,0}(k)+f(k)H_{p,1}(k)+j(k)H_{p,2}(k)$$

Therefore, when weighting is used, it follows that:

$$\begin{bmatrix} H_{p,0}(k) \\ H_{p,1}(k) \\ H_{p,2}(k) \end{bmatrix} = \begin{bmatrix} d(k) & -b(k) & g(k) \\ -c(k) & a(k) & h(k) \\ e(k) & f(k) & j(k) \end{bmatrix}^{-1} \begin{bmatrix} H_{p,0}'(k) \\ H_{p,1}'(k) \\ H_{p,2}'(k) \end{bmatrix} = W(k) \begin{bmatrix} H_{p,0}'(k) \\ H_{p,1}'(k) \\ H_{p,2}'(k) \end{bmatrix}$$

Accordingly, for Q number of transmitting antennas or streams, the number of entries in the matrix is $Q^2$. Thus, in a four transmit antenna (or stream) system, 4×4 matrix is applicable.

Thus, a scheme to provide channel estimation when a transmitter has multiple transmitting antennas (or stream) is described. The techniques is applicable to transmission of orthogonal preambles in a wireless communication to train a receiver to identify and estimate the channels. In one technique, tone interleaving is used to map the subcarrier indices. Other techniques, such as cyclic delay with orthogonal mapping, may be readily employed as well to practice the invention.

The technique described may be implemented in a variety of transmission and receiving devices that utilize multiple antennas. In one embodiment, the technique described may be implemented in radio 60 shown in FIG. 2.

Thus, channel estimation for orthogonal preambles in a MIMO system is described.

We claim:

1. A method comprising:

separating data into multiple transmitting paths to transmit the data from one or more transmitting antennas by including an orthogonal preamble having training symbols, in which a training symbol is included in each time block of transmission for each transmitting antenna and in which a grouping of multiple time blocks from each transmitting antenna is determined by either a number of transmitting antennas or data streams utilized to send the data, wherein a preamble for each transmitting antenna is separated for transmission across the grouping of time blocks for each transmitting antenna by dividing subcarriers of the transmission into grouping of subcarrier indices; and transmitting a group of subcarrier indices in a respective time block of a grouping of time blocks for each transmitting antenna, but in which a different set of subcarrier indices are transmitted from each of the transmitting antennas in a given time block, so that a complete set of subcarrier indices, although of different preambles, are sent in each time block from all of the transmitting antennas to allow a receiver that receives all of the time blocks from all of the transmitting antennas to perform channel estimation by first obtaining an interim channel estimation value which is then operated on by a weighting matrix stored in the receiver, in which the weighting matrix has coefficients corresponding to the training symbols and the weighting matrix is quantized instead of quantizing each entry in the weighting matrix, wherein results of the weighting matrix operation on the interim channel estimation value are saturated to select a predetermined number of bits to obtain channel estimation from the training symbols.

2. The method of claim 1, wherein separating the data includes separating the subcarriers into even and odd subcarrier indices and wherein a preamble is sent in two time blocks from each antenna.

3. The method of claim 2, wherein transmitting includes transmitting even subcarriers from a first antenna and odd subcarriers from a second antenna during a first time block and sending odd subcarriers from the first antenna and even subcarriers from the second antenna during a second time block.

4. The method of claim 2, wherein transmitting includes sending a first training symbol having a coefficient value "d" from a first antenna and a second training symbol having a coefficient value "-b" from a second antenna during a first time block; and sending a third training symbol having a coefficient value "-c" from the first antenna and a fourth training symbol having a coefficient value "a" from the second antenna during a second time block, where "a", "-b", "-c" and "d" are predetermined values.

5. The method of claim 4, wherein the coefficient values "a" and "b" have a value of $1/\sqrt{2}$ as corresponding coefficients in the weighting matrix and "-b" and "-c" have a value of 0 as corresponding coefficients in the weighting matrix for even subcarriers; and wherein the coefficient values "a" and "b" have a value of 0 as corresponding coefficients in the weighting matrix and "-b" and "-c" have a value of $-1/\sqrt{2}$ as corresponding coefficients in the weighting matrix for odd subcarriers.

6. The method of claim 1, wherein separating the data includes separating the subcarriers into three subcarrier indices for a transmitter having three transmitting antennas and wherein transmitting includes sending a first training symbol having a coefficient value "d" from a first antenna, a second training symbol having a coefficient value "-b" from a second antenna and a third training symbol having a coefficient "g" from a third antenna during a first time block; sending a fourth training symbol having a coefficient value "-c" from the first antenna, a fifth training symbol having a coefficient value "a" from the second antenna and a sixth training symbol having a coefficient "h" from the third antenna during a second time block; and sending a seventh training symbol having a coefficient value "e" from the first antenna, an eighth training symbol having a coefficient value "f" from the second antenna and a ninth training symbol having a coefficient "j" from the third antenna during a third time block, where "a", "-b", "-c", "d", "e", "f", "g", "h" and "j" are predetermined values.

7. A method comprising:

receiving data transmitted from one or more transmitting antennas that includes an orthogonal preamble having training symbols, in which a training symbol is included in each time block of transmission for each transmitting antenna and in which a grouping of multiple time blocks from each transmitting antenna is determined by either a number of transmitting antennas or data streams utilized to send the data, wherein a preamble for each transmitting antenna is separated for transmission across the grouping of time blocks for each transmitting antenna by dividing subcarriers of the transmission into grouping of subcarrier indices and wherein a group of subcarrier indices in a respective time block of a grouping of time blocks for each transmitting antenna are transmitted, but in which a different set of subcarrier indices are transmitted from each of the transmitting antennas in a given time block, so that a complete set of subcarrier indices, although of different preambles, are sent in each time block from all of the transmitting antennas to allow a receiver that receives all of the time blocks from all of the transmitting antennas to perform channel estimation; and performing channel estimation by first obtaining an interim channel estimation value which is then operated on by a weighting matrix stored in the receiver, in which the weighting matrix has coefficients corresponding to the training symbols and the weighting matrix is quantized instead of quantizing each entry in the weighting matrix, wherein results of the weighting matrix operation on the interim channel estimation value are saturated to select a predetermined number of bits to obtain channel estimation from the training symbols.

8. The method of claim 7, wherein receiving includes receiving training symbols in subcarriers that are frequency indexed as even and odd subcarrier indices, in which a first even subcarrier indices from a first transmitting antenna and a first odd subcarrier indices from a second transmitting antenna are received during a first time block, and a second even subcarrier indices from the second transmitting antenna and a second odd subcarrier indices from the first transmitting antenna are received during a second time block.

9. The method of claim 7, wherein receiving includes receiving a first training symbol having a coefficient value "d" that was sent from a first transmitting antenna during a first time block, a second training symbol having a coefficient value "-b" that was sent from a second transmitting antenna during the first time block, a third training symbol having a coefficient value "-c" that was sent from the first transmitting antenna during a second time block, and a fourth training symbol having a coefficient value "a" that was sent from the second transmitting antenna during the second time block, where "a", "-b", "-c" and "d" are predetermined values.

10. The method of claim 9, wherein the coefficient values "a" and "b" have a value of $1\sqrt{2}$ as corresponding coefficients in the weighting matrix and "-b" and "-c" have a value of 0 as corresponding coefficients in the weighting matrix for even subcarriers; and wherein the coefficient values "a" and "b" have a value of 0 as corresponding coefficients in the weighting matrix and "-b" and "-c" have a value of $-1\sqrt{2}$ as corresponding coefficients in the weighting matrix for odd subcarriers.

11. The method of claim 9, wherein receiving includes receiving the training symbols by multiple receiving antennas.

12. The method of claim 7, wherein receiving includes receiving a first training symbol having a coefficient value "d" that was sent from a first transmitting antenna, a second training symbol having a coefficient value "-b" that was sent from a second transmitting antenna, and a third training symbol having a coefficient "g" that was sent from a third antenna during a first time block; a fourth training symbol having a coefficient value "-c" that was sent from the first transmitting antenna, a fifth training symbol having a coefficient value "a" that was sent from the second transmitting antenna and a sixth training symbol having a coefficient "h" that was sent from the third antenna during a second time block; and a seventh training symbol having a coefficient value "e" that was sent from the first transmitting antenna, an eighth training symbol having a coefficient value "f" that was sent from the second transmitting antenna and a ninth training symbol having a coefficient "j" that was sent from the third transmitting antenna during a third time block, where "a", "-b", "-c", "d", "e", "f", "g", "h" and "j" are predetermined values.

13. The method of claim 12 wherein receiving includes receiving the training symbols by multiple receiving antennas.

14. An apparatus comprising a receiver to receive data transmitted from one or more transmitting antennas that includes an orthogonal preamble having training symbols, in which a training symbol is included in each time block of transmission for each transmitting antenna and in which a grouping of multiple time blocks from each transmitting antenna is determined by either a number of transmitting antennas or data streams utilized to send the data, wherein a preamble for each transmitting antenna is separated for transmission across the grouping of time blocks for each transmitting antenna by dividing subcarriers of the transmission into grouping of subcarrier indices and wherein a group of subcarrier indices in a respective time block of a grouping of time blocks for each transmitting antenna are transmitted, but in which a different set of subcarrier indices are transmitted from each of the transmitting antennas in a given time block, so that a complete set of subcarrier indices, although of different preambles, are sent in each time block from all of the transmitting antennas to allow a receiver that receives all of the time blocks from all of the transmitting antennas to perform channel estimation, in which the receiver performs channel estimation by first obtaining an interim channel estimation value which is then operated on by a weighting matrix stored in the receiver, in which the weighting matrix has coefficients corresponding to the training symbols and the weighting matrix is quantized instead of quantizing each entry in the weighting matrix, wherein results of the weighting matrix operation on the interim channel estimation value are saturated to select a predetermined number of bits to obtain channel estimation from the training symbols.

15. The apparatus of claim 14, wherein the receiver to receive the training symbols in subcarriers that are frequency indexed as even and odd subcarrier indices, in which a first even subcarrier indices from a first transmitting antenna and a first odd subcarrier indices from a second transmitting antenna are received during a first time block, and a second even subcarrier indices from the second transmitting antenna and a second odd subcarrier indices from the first transmitting antenna are received during a second time block.

* * * * *

UNITED STATES PATENT AND TRADEMARK OFFICE
CERTIFICATE OF CORRECTION

PATENT NO. : 7,693,228 B2  Page 1 of 1
APPLICATION NO. : 11/298157
DATED : April 6, 2010
INVENTOR(S) : Carlos Aldana et al.

It is certified that error appears in the above-identified patent and that said Letters Patent is hereby corrected as shown below:

Column 15, line 7, in Claim 10: replace "1√2" with -- 1/√2 --

Column 15, line 12, in Claim 10: replace "-1√2" with -- -1/√2 --

Signed and Sealed this
Thirty-first Day of January, 2012

David J. Kappos
*Director of the United States Patent and Trademark Office*